(12) United States Patent
Yang

(10) Patent No.: US 11,574,051 B2
(45) Date of Patent: Feb. 7, 2023

(54) MALWARE IDENTIFICATION USING MULTIPLE ARTIFICIAL NEURAL NETWORKS

(71) Applicant: Fortinet, Inc., Sunnyvale, CA (US)

(72) Inventor: Xu Yang, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 1225 days.

(21) Appl. No.: 16/053,479

(22) Filed: Aug. 2, 2018

(65) Prior Publication Data

US 2020/0042701 A1 Feb. 6, 2020

(51) Int. Cl.
| | |
|---|---|
| G06F 21/56 | (2013.01) |
| G06N 3/08 | (2006.01) |
| G06N 3/04 | (2006.01) |
| G06K 9/62 | (2022.01) |
| H04L 9/40 | (2022.01) |

(52) U.S. Cl.
CPC ........... *G06F 21/56* (2013.01); *G06K 9/6264* (2013.01); *G06N 3/0454* (2013.01); *G06N 3/084* (2013.01); *H04L 63/1416* (2013.01)

(58) Field of Classification Search
USPC ........... 706/15; 726/2, 21, 36; 713/150, 163, 713/181; 380/255, 264, 276
See application file for complete search history.

(56) References Cited

U.S. PATENT DOCUMENTS

| | | | | |
|---|---|---|---|---|
| 7,565,549 | B2* | 7/2009 | Satterlee ................. | G06F 21/51 713/193 |
| 8,250,375 | B2* | 8/2012 | Carpenter ............... | G06F 21/73 380/284 |
| 8,289,971 | B2* | 10/2012 | Furber .................... | H04L 45/06 370/395.31 |

(Continued)

OTHER PUBLICATIONS

Taha, Altyeb Altaher et al., "Malware detection based on evolving clustering method for classification", Scientific Research and Essays vol. 7(22), pp. 2031-2036, Jun. 14, 2012.

(Continued)

*Primary Examiner* — Sharif E Ullah
(74) *Attorney, Agent, or Firm* — Law Office of Dorian Cartwright; Dorian Cartwright

(57) ABSTRACT

Systems and methods for malware detection using multiple neural networks are provided. According to one embodiment, for each training sample, a supervised learning process is performed, including: (i) generating multiple code blocks of assembly language instructions by disassembling machine language instructions contained within the training sample; (ii) extracting dynamic features corresponding to each of the code blocks by executing each of the code blocks within a virtual environment; (iii) feeding each code block into a first neural network and the corresponding dynamic features into a second neural network; (iv) updating weights and biases of the neural networks based on whether the training sample was malware or benign; and (v) after processing a predetermined or configurable number of the (Continued)

training samples, the neural networks criticize each other and unify their respective weights and biases by exchanging their respective weights and biases and adjusting their respective weights and biases accordingly.

8 Claims, 6 Drawing Sheets

(56) References Cited

U.S. PATENT DOCUMENTS

| | | | | |
|---|---|---|---|---|
| 8,355,514 | B2* | 1/2013 | Rhoads | G07F 7/1016 380/252 |
| 8,433,582 | B2* | 4/2013 | Ramabadran | G10L 21/038 704/226 |
| 2003/0088778 | A1* | 5/2003 | Lindqvist | H04L 67/63 348/E7.071 |
| 2007/0174633 | A1* | 7/2007 | Draper | G06V 40/1353 713/181 |
| 2015/0317496 | A1* | 11/2015 | Olmos | G06F 1/14 726/36 |
| 2022/0141026 | A1* | 5/2022 | Smith | G06T 1/20 713/181 |

OTHER PUBLICATIONS

Baldangombo, Usukhbayar et al., "A Static Malware Detection System Using Data Mining Methods", Department of Communication Technology, School of Information Technology, National University of Mongolia; Department of Computer Science and Information Engineering, National Taiwan University of Science and Technology, Taipei, 13 pages.
Kumar, Ajit et al., "A learning model to detect maliciousness of portable executable using integrated feature set", Journal of King Saud University—Computer and Information Sciences, 2017, 14 pages.
Kolosnjaji, Bojan et al., "Adversarial Malware Binaries: Evading Deep Learning for Malware Detection in Executables" Technical University of Munich, University of Cagliari, Italy, Mar. 12, 2018, 5 pages.
Moskovitch, Robert et al., "Malicious Code Detection Using Active Learning", Deutsch Telekom Laboratories at Ben Gurion University, 2009, 18 pages.
Bai, Jinrong et al., "A Malware Detection Scheme Based on Mining Format Information", The Scientific World Journal, vol. 2014, Article ID 260905, 13 pages.
Belauoued, Mohamed et al. "A Real-Time PE-Malware Detection System Based on CHI-Square Test and PE-File Features", https://hal.inria.fr/hal-01789936, May 11, 2018, 11 pages.
Egele, Manuel, et al., "A Survey on Automated Dynamic Malware-Analysis Techniques and Tools", ACM Computing Surveys, vol. 44, No. 2, Article 6, Feb. 2012, 42 pages.

Ye, Dongyi et al., "An intelligent PE-malware detection system based on association mining", Journal in Computer Virology, Nov. 2008, 13 pages.
Schultz, Matthew G, et al., "Data Mining Methods for Detection of New Malicious Executables", 12 pages.
Ahmadi, Mansour et al., Novel Feature Extraction, Selection, and Fusion for Effective Malware Family Classification, 2016, 12 pages.
Yan, Guanhua, et al., "Exploring Discriminatory Features for Automated Malware Classification", 2013, 21 pages.
Liao, Yibin, "PE-Header-Based Malware Study and Detection", Department of Computer Science, The University of Georgia, 4 pages.
Mirza, Fauzan, et al., "PE-Miner: Mining Structural Information to Detect Malicious Executables in Realtime", Jan. 23, 2014, 21 pages.
Vinod, P., et al., "Scattered Feature Space for Malware Analysis", https://www.researchgate.net/publication/220790150, Apr. 18, 2015, 11 pages.
Kumar, A., et al. "A learning model to detect maliciousness of portable executable using integrated feature set." Journal of King Saud University—Computer and Information Sciences 2017, 14 pgs.
Altaher, A., et al. "Malware detection based on evolving clustering method for classification." Scientific Research and Essays vol. 7(22), pp. 2031-2036, Jun. 14, 2012. http://www.academicjournals.org/SRE.
Baldangombo, U., et al. "A Static Malware Detection System Using Data Mining Methods." 13 pgs.
Kolosnjaji, B., et al. "Adversarial Malware Binaries: Evading Deep Learning for Malware Detection in Executables." 5 pgs.
Bai, J., et al. "A Malware Detection Scheme Based on Mining Format Information." Hindawi Publishing Corporation. The Scientific World Journal. vol. 2014, Article ID 260905, 11 pages. http://dx.doi.org/10.1155/2014/260905.
Moskovitch, R., et al. "Malicious Code Detection Using Active Learning." 18 pgs.
Belaoued, M., et al. "A Real-Time PE-Malware Detection System Based on CHI-Square Test and PE-File Features." 5th International Conference on Computer Science and Its Applications (CIIA), May 2015, pp. 416-425.
Egele, M., et al. "A Survey on Automated Dynamic Malware-Analysis Techniques and Tools." 2012, ACM Computing Surveys, vol. 44, No. 2, Article 6, 42 pgs.
Ye, Y., et al. "An intelligent PE-malware detection system based on association mining." Comput Virol (2008) 4:323-334.
Schultz, M., et al. "Data Mining Methods for Detection of New Malicious Executables." 12 pgs.
Ahmadi, M., et al. "Novel Feature Extraction, Selection and Fusion for Effective Malware Family Classification." 12 pgs.
Yan, G., et al. "Exploring Discriminatory Features for Automated Malware Classification." 21 pgs.
Liao, Y. "PE-Header-Based Malware Study and Detection." 4 pgs.
Zubair Shafiq, M., et al. "PE-Miner: Mining Structural Information to Detect Malicious Executables in Realtime." 21 pgs.
P., Vinod., et al. "Scattered Feature Space for Malware Analysis." 11 pgs.

* cited by examiner

MALWARE IDENTIFICATION USING MULTIPLE ARTIFICIAL NEURAL NETWORKS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to the field of malware identification and neural network training, and more particularly to malware identification using multiple neural networks that provide feedback (e.g., weight and bias information) to each other during training regarding different features of a common sample set.

Description of the Related Art

Malicious software, also known as computer contaminants or malware, is software that is intended to do direct or indirect harm in relation to one or more computer systems. Such harm can manifest as the disruption or prevention of the operation of all or part of a computer system, accessing private, sensitive, secure and/or secret data, software and/or resources of computing facilities, or the performance of illicit, illegal or fraudulent acts. Malware includes, inter alia, computer viruses, worms, botnets, trojans, spyware, adware, rootkits, keyloggers, dialers, malicious browser extensions or plugins and rogue security software.

Finding distinct functions and corresponding data blocks along with their locations in code samples is an important characteristic in connection with identifying malware. Such distinct functions and data blocks are hard to find using existing reverse engineering approaches due to the significant amount of noise (e.g., junk instructions, useless functions/loops, among other tricks) that are deployed by malware authors and/or malware packers in an effort to avoid detection and analysis.

The current state of malware identification involving the use of neural network analysis relies on a single convolutional neural network or a single recurrent neural network focusing solely on static information (e.g., existence of a particular combination of instructions or specific application programming interface (API) calls) within a file or code block at issue, resulting in unsatisfactory detection rates and high false positive rates.

SUMMARY

Systems and methods are described for malware detection using multiple neural networks that share and adjust weight and bias information with each other during training on distinct features of a common sample set. According to one embodiment, a method of training a deep neural network model for classification of malware is provided. For each training sample of multiple training samples, including malware samples and benign samples in a form of executable files a supervised learning process is performed, including: (i) generating, by a pre-processing module running on a computer system, multiple code blocks of assembly language instructions by disassembling machine language instructions contained within the training sample; (ii) extracting, by the pre-processing module, dynamic features corresponding to each of the code blocks by executing each of the code blocks within a virtual environment; (iii) for each code block: (a) feeding the code block into a first neural network: and feeding the corresponding dynamic features for the code block into a second neural network; (iv) updating weights and biases of the first neural network and weights and biases of the second neural network based on whether the training sample was a malware sample or a benign sample; and (v) after processing a predetermined or configurable number of the training samples, the first neural network and the second neural network criticize each other and unify their respective weights and biases by exchanging their respective weights and biases and adjusting their respective weights and biases accordingly.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
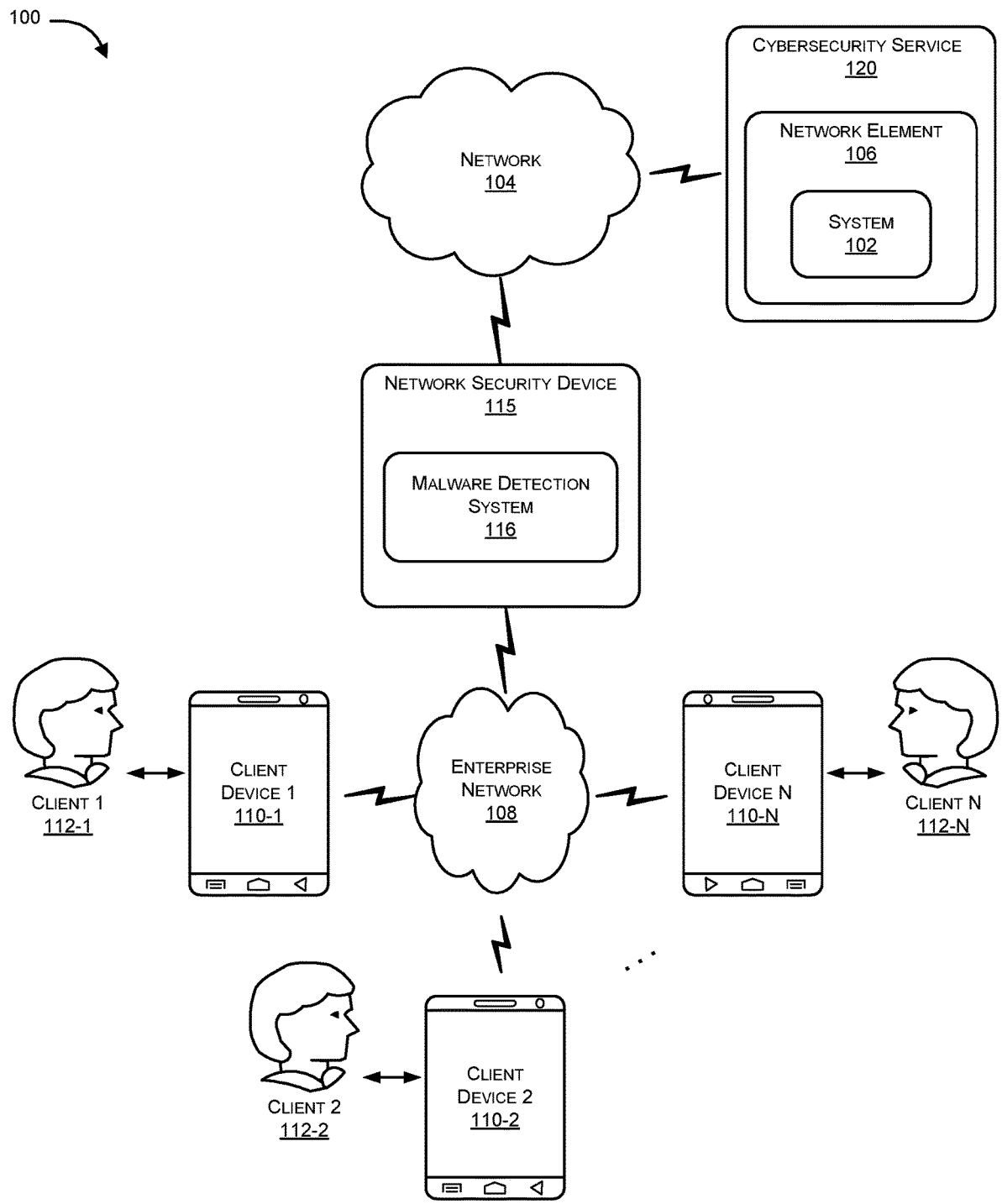
FIG. 1 illustrates an exemplary network architecture in which aspects of the present invention can be implemented in accordance with an embodiment of the present invention.

Systems and methods are described for malware detection using multiple neural networks that share and adjust weight and bias information with each other during training on distinct features of a common sample set. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrase "executable file," "binary file," "executable," or "binary" generally refer to a file containing executable instructions, typically produced as a result of compiling a high-level programming language, that cause a computer to perform indicated tasks according to encoded instructions. Notably, the encoded instructions may be in the form of machine code instructions that are executed by a physical central processing unit (CPU) or may be in the form of bytecodes or scripting language instructions that are executed by a software interpreter. Non-limiting examples of the format of executable files include Portable Executable (PE) and PE32+. PE is a file format for executables, object code, dynamic linked libraries (DLLs), FON Font files, and others used in 32-bit and 64-bit versions of WINDOWS® operating systems. The PE format is a data structure that encapsulates the information necessary for the WINDOWS OS loader to manage the wrapped executable code. PE32+ was introduced by 64-bit versions of the WINDOWS operating system and is essentially a PE file with wider fields.

The phrase "code block" generally refers to a sequence of disassembled code, identified, for example, by parsing an executable file for certain code block delimiters, including, but not limited to, jump instructions, conditional jump instructions and call instructions. Alternatively, a code block may simply represent a sequence of a predetermined and/or configurable number of instructions.

The phrase "static feature" generally refers to a feature of a code block or of the executable file of which it is a part that is ascertained by performing static analysis of the code block (without running/executing the code block). Non-limiting examples of static features include the code implementation of the code block, the existence of certain predefined strings within the code block, the existence of certain predefined or configurable keywords in the code block, the number and/or type of Application Programming Interface (API) calls represented within the code block, the file name of the executable file, the MD5 checksum or hash of the executable file, the file type of the executable file, the file size of the executable file, PE file information (e.g., the section table, headers and sections). Code implementation refers to the mechanism used to achieve a particular result. For example, there are numerous ways to put the value 0x5656 into a register, including, but not limited to, the following:

(i) mov eax,0x5656;
(ii) xor eax,eax; and then xor eax,0x5656;
(iii) xor eax,eax; and then add eax,0x5656;

The phrase "dynamic feature" generally refers to a feature of a code block that is ascertained by performing dynamic analysis of the code block (e.g., running/executing the code block, for example, to observe its behavior and/or understand its functionality). Non-limiting examples of dynamic features include run-time results (e.g., the status of one or more central processing unit (CPU) registers) produced by executing the code block, call flows resulting from executing the code block, a path profile resulting from executing the code block. In the context of performing dynamic analysis, one might be interested to know what the run-time values of one or more registers are. For example, one might want to know if the value of the eax register is 0x5656 after executing a code block. Dynamic analysis doesn't care about what instructions were used to produce that result, it only cares about whether the run-time value is 0x5656.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

Systems and methods are described for malware identification/detection using multiple neural networks that criticize each other during a training phase to obtain optimized weight and bias values for training samples. In an embodiment, multiple neural networks can each be trained on a particular feature or set of features (e.g., one or more static features or one or more dynamic features) associated with code blocks of training samples provide in the form of executable files. For example, a first neural network and a second neural network can be trained by performing a supervised learning process. A network element, which may be a part of cybersecurity service (e.g., the FORTIGUARD intrusion prevention service available from the assignee of the present invention), receives multiple training samples. The training samples are pre-processed before training of the multiple deep neural networks. The pre-processing may include disassembling the training samples to identify code blocks within each of the training samples by parsing the assembly code, for example, based on predefined delimiters (e.g., jump instructions, conditional jump instructions and call instructions). The pre-processing may also include normalizing the instruction operands (e.g., registers and immediate values) within each code block and tagging the code blocks as being associated with a known malware sample or a known benign sample. Furthermore, a run-time context extractor can extract run-time results (e.g., the status of various registers) of each code block. After pre-processing has been completed for the code blocks, the code blocks are feed into a first deep neural network that detects static features of the code blocks and corresponding run-time status is feed into a second deep neural network. On a sample-by-sample basis, the weights and bias of the deep neural networks are internally revised based on whether the training sample at issue was malware or benign. Periodically, during the training process, after processing of a mini-batch of training sample files the deep neural networks criticize each other by exchanging weight and bias information and adjust their weight and bias information accordingly (e.g., by averaging their weight and bias information with that provided by the other deep neural network). In one embodiment, the mini-batch size is based on the number of the samples (files) used for training, and it can be adjusted after each training batch. Depending upon the particular implementation, a mini-batch size of between 500 to 1,000 can be used as the mini-batch size.

According to various embodiments of the present disclosure, after the multiple neural networks have been trained, they can be used to perform malware detection. A network element, which may be a part of cybersecurity service or a network security device that has been provided with the deep neural network model resulting from the training phase, may receive an executable file that is to be processed for malware identification. As during the training phase, the executable file may be pre-processed (e.g., disassembled, parsed and normalized) to generate code blocks. Further, corresponding features of the code blocks, for example, code implementation, run-time status, call flows, etc. can be obtained for each code block. Each distinct feature may then be processed by a distinct neural network. The outputs of the distinct neural networks may be combined to produce a classification result for the executable file.

FIG. 1 illustrates an exemplary network architecture 100 in which aspects of the present invention can be implemented in accordance with an embodiment of the present invention. According to an embodiment, a system 102 within a network element 106 forms a part of a cybersecurity service 120 to identify malware using a multiple deep neural network based approach. Cybersecurity service 120 may represent a cloud-based security service, providing one or more of malware scanning, intrusion prevention and/or the like to enterprises that pay a subscription fee and/or have purchased one or more network security devices from the network security vendor providing the cloud-based security service.

System 102 can be communicatively coupled with a public network 104, such as the Internet, so as to be available for use by an enterprise network 108. Network element 106 can be any computing device or network device capable of training and running multiple deep neural networks. For example, network element 106 can be a single server or multiple rack servers. In another implementation, network element 106 can include, but is not limited to, a storage device, a fast parallel I/O bus, a Central Processing Unit (CPU) and a cache. In yet another implementation, network element 106 can include any hardware that could perform mathematical computation such as a CPU, a Graphics Processing Unit (GPU), a Field-Programmable Gate Array (FPGA), an Application-Specific Integrated Circuit (ASIC), and the like.

Network security device 115 separates the external computing environment, represented by network 104, from the internal computing environment of enterprise network 108. Network security device 111 may intercept communications between network 104 and the network appliances of enterprise network 108 and may, among other things, scan network traffic attempting to pass through it for malware, viruses or high-risk network accesses.

In the context of the present simplified example, enterprise network 108 includes multiple client devices 110-1, 110-2, . . . , 110-N (which may be collectively referred to herein as client devices 110 and may be individually referred to herein as client device 110). Clients 112-1, 112-2, . . . , 112-N (collectively referred to as clients 112 and individually referred to as client 112, hereinafter) of enterprise network 108 network can interact with the client devices 110, which can include personal computers, smart devices, web-enabled devices, hand-held devices, laptops, mobile phones and the like.

Client devices 110 of enterprise network 108 can receive data packets of information from external network 104 through network security device 115 that can implement a malware detection system 116. Responsive to receiving an executable file as part of network traffic to be processed to determine whether it contains malware, malware detection system 116 may provide the executable file to cybersecurity service 120 for analysis. Alternatively, a deep neural network model trained by cybersecurity service 120 can be used by network security device 115 as a local malware detection model to allow malware detection system 116 to locally process executable files observed within intercepted network traffic.

Those skilled in the art would appreciate that, various networks in architecture 100 can be wireless networks, wired networks or a combination thereof that can be implemented as one of the different types of networks, such as Intranet, Local Area Network (LAN), Wide Area Network (WAN), Internet, and the like. Further, the networks can either be dedicated networks or shared networks. The shared networks represent an association of the different types of networks that use a variety of protocols, for example, Hypertext Transfer Protocol (HTTP), Transmission Control Protocol/Internet Protocol (TCP/IP), Wireless Application Protocol (WAP), and the like.

According to various embodiments of the present disclosure, system 102 provides malware identification/detection using a deep neural network model that includes multiple neural networks. In an embodiment, system 102 can receive a file that is to be processed for malware identification from network security device 115. Further, system 102 can process the file to generate code blocks and can obtain corresponding features for each code block that can include code implementation, run-time status, call flows, etc. Each distinct feature may then be processed by a distinct neural network of the multiple neural networks. As described in further detail below, during a supervised learning process, the multiple neural networks may periodically (e.g., after each mini-batch of training samples) criticize each other by sharing weight and bias information based upon which each neural network may adjust its internal weight and bias information (e.g., by averaging its weight and bias information with that provided by one or more other of the multiple neural networks).

Although in various embodiments, the implementation of system 102 is explained with regard to the network element 106, those skilled in the art would appreciate that, system 102 can fully or partially be implemented in network security device 115 with minor modifications, without departing from the scope of the present disclosure. For example, in an implementation training of the deep neural network model can be performed in network element 106 within cybersecurity service 120 and the trained deep neural network model can be provided to network security device 115 so as to allow malware detection system 116 to perform local detection or identification of malware.

Figure 2A:
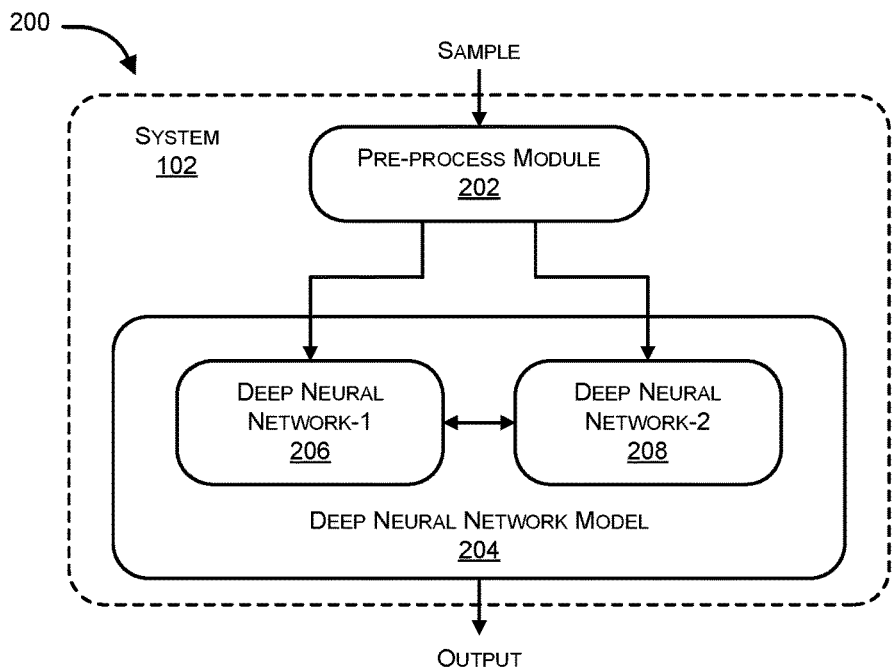
FIG. 2A is a simplified block diagram conceptually illustrating the training of multiple neural networks for enhanced malware identification in accordance with an embodiment of the present invention.

FIG. 2A is a simplified block diagram 200 conceptually illustrating the training of multiple neural networks for enhanced malware identification in accordance with an embodiment of the present invention. In the context of the present example, system 102 may receive an executable file (e.g., in its capacity as part of a cybersecurity service, such as cybersecurity service 120, from a network security device protecting a private network or in its capacity as a malware detection system, such as malware detection system 116) that is to be processed for malware identification (e.g., scanned for the existence of malware). Those skilled in the art will appreciate that a code block is a set of instructions or a section of software code or an algorithm in software programming that includes one or more statements or declarations to form control structures. The main utility of identifying code blocks is to allow the entire section of code containing the block to be treated as a single piece of code. As described further below, a pre-processing module 202 can pre-process the executable file to extract features for processing by multiple deep neural networks (e.g., deep neural network 206 and deep neural network 208).

Pre-processing module 202 processes the received executable file to generate one or more code blocks. The code blocks can be generated by disassembling machine language instructions contained within the executable file and parsing the resulting assembly language instructions to identify multiple code blocks. In one embodiment, a code block is identified by reading the assembly language instructions until a predefined or configurable delimiter instruction (e.g., a jump instruction, a conditional jump instruction or a call instruction) is encountered and then repeating this process until the end of the executable file.

For the purpose of providing a concrete example, the following set of assembly language instructions (post disassembly) can be considered that is to be divided into code blocks.

```
push        ebx
push        esi
mov         esi, offset unk_4312AC
mov         ebx, offset unk_4312AC
cmp         esi, ebx
jnb         short loc_40CD2A
push        edi
mov         edi, [esi]
test        edi, edi
jz          short loc_40CD22
mov         ecx, edi
call        loc_40C8E2
```

In the context of the present example, the set of instructions can be broken into code bocks using jump instructions (e.g., jnb and jz in this example) or a call instruction as delimiters, thus, the code blocks can be defined as follows:

```
// codeblock1 start //
push        ebx
push        esi
mov         esi, offset unk_4312AC
mov         ebx, offset unk_4312AC
cmp         esi, ebx
jnb         short loc_40CD2A
// codeblock1 end //
// codeblock2 start //
push        edi
mov         edi, [esi]
test        edi, edi
jz          short loc_40CD22
// codeblock2 end //
// codeblock3 start //
mov         ecx, edi
call        loc_40C8E2
// codeblock3 end //
```

Alternatively, code blocks can be formed having a fixed number of instructions (e.g., three, five, ten or another predefined or configurable number of instructions) in each code block. Assuming, code blocks of three instructions, the code blocks for the present example would be defined as:

```
// codeblock1 start //
push        ebx
push        esi
mov         esi, offset unk_4312AC
// codeblock1 end //
// codeblock2 start //
mov         ebx, offset unk_4312AC
cmp         esi, ebx
jnb         short loc_40CD2A
// codeblock2 end //
// codeblock3 start //
push        edi
mov         edi, [esi]
test        edi, edi
// codeblock3 end //
// codeblock4 end //
jz          short loc_40CD22
mov         ecx, edi
call        loc_40C8E2
// codeblock4 end //
```

To the extent there are not enough instructions to fill the last code block upon reaching the end of the assembly language instructions associated with the executable file (which will occur when the total number of assembly language instructions associated with the executable file is not a multiple of the predefined or configurable fixed number of instructions), the last code block may include fewer than the predefined or configurable fixed number of instructions.

Those skilled in the art will appreciate that the definition of code blocks based on jump/call and a fixed number of assembly language instructions as described above are provided simply as two possible ways to divide up an executable file into code blocks and various other alternative techniques may be used to group the instructions into code blocks.

In one embodiment, after the code blocks have been identified, they are normalized as described further below with reference to FIG. 3.

According to an embodiment, pre-processing module 202 may extract various features of the code blocks that may aid in identifying whether the executable file is associated with or contains malware. In one embodiment, pre-processing module 202 can obtain corresponding run-time status of each code block by running the code block in a virtual environment (e.g., a sandbox, such as FORTISANDBOX available from the assignee of the present invention). In another example, in which three distinct deep neural networks are employed, pre-processing module 202 can extract a call flow or graph for each code block to identify a topology of the code block. Those skilled in the art will appreciate while a dual neural network embodiment is described herein, there is no limit to the number of neural networks that can be used. The task for the implementer would simply be to identify an independent feature or set of features for each additional neural network employed.

According to an embodiment, for each code block, various independent types of features (e.g., static features, dynamic features and/or a graph or topology of call flows) can be provided to a deep neural network model 204. Deep neural network model 204 can include multiple deep neural networks—one for each type of feature, such that for each code block, each feature can be analyzed by an individual neural network of the multiple neural networks. Those skilled in the art would appreciate that, for the purpose of simplification, embodiments of the present disclosure are explained considering two neural networks (i.e., deep neural network-1 206 (which may be referred to as DNN 206 hereinafter) and deep neural network-2 208 (which may be referred to as DNN 208 hereinafter) as a part of deep neural network model 204.

In context of the present example, for each code block, the code block can be provided as input to a first neural network (i.e., DNN 206), and its corresponding run-time status can be provided as input to a second neural network (i.e., DNN 208). Thus, DNN 206 may process the code blocks with respect to static features (e.g., their respective code implementations) to generate a first output for each code block. Simultaneously, DNN 208 may process the corresponding run-time status for each code block to generate a second output for each code block. According to one embodiment, the activation function used during the training of DNN 206 and DNN 208 is a rectifier linear unit (ReLU).

In an implementation, DNN 206 and DNN 208 may have the same structure and may work together to criticize each other in order to obtain an appropriate output as described further below. In one embodiment, DNN 206 may focus on identifying distinct implementations of the code blocks (e.g., distinct sequences and/or combinations of instructions); whereas DNN 208 may focus on the distinct run-time status of each code block (e.g., the run-time result of each code block, including the value of all or some subset of the general purpose registers and all or a subset of the flags register). As such, each of the deep neural networks operating within deep neural network model 204 may have a different scope of the same code block.

According to an embodiment, DNN 206 and DNN 208 are both trained with a supervised learning processing and a backpropagation method with a mini-batch gradient-based optimizer (e.g., a gradient descent optimizer). After each mini-batch, these two neural networks will provide feedback to each other (criticize each other) by sharing with each other their respective weight and bias and adjust their respective weigh and bias accordingly as described further below via an unify function, for example. An exemplary technique for training multiple neural networks is explained further below with reference to FIG. 3A and FIG. 3B and a scanning process that utilizes the trained neural networks to identify whether an executable file at issue contains or is otherwise associated with malware is explained further below with reference to FIG. 4A and FIG. 4B.

As stated above, deep neural network model 204 may include multiple neural networks and is explained herein using DNN 206 and DNN 208 for sake of simplicity. Those skilled in the art will appreciate that deep neural network model 204 may include a third neural network (not shown) that can be trained on and configured to use call flow for each code block as a feature to generate a third output for each code block. Those skilled in the art will appreciate the multiple neural network approach described herein is extensible to accommodate additional neural networks for each additional independent feature or set of features desired to be used.

Figure 2B:
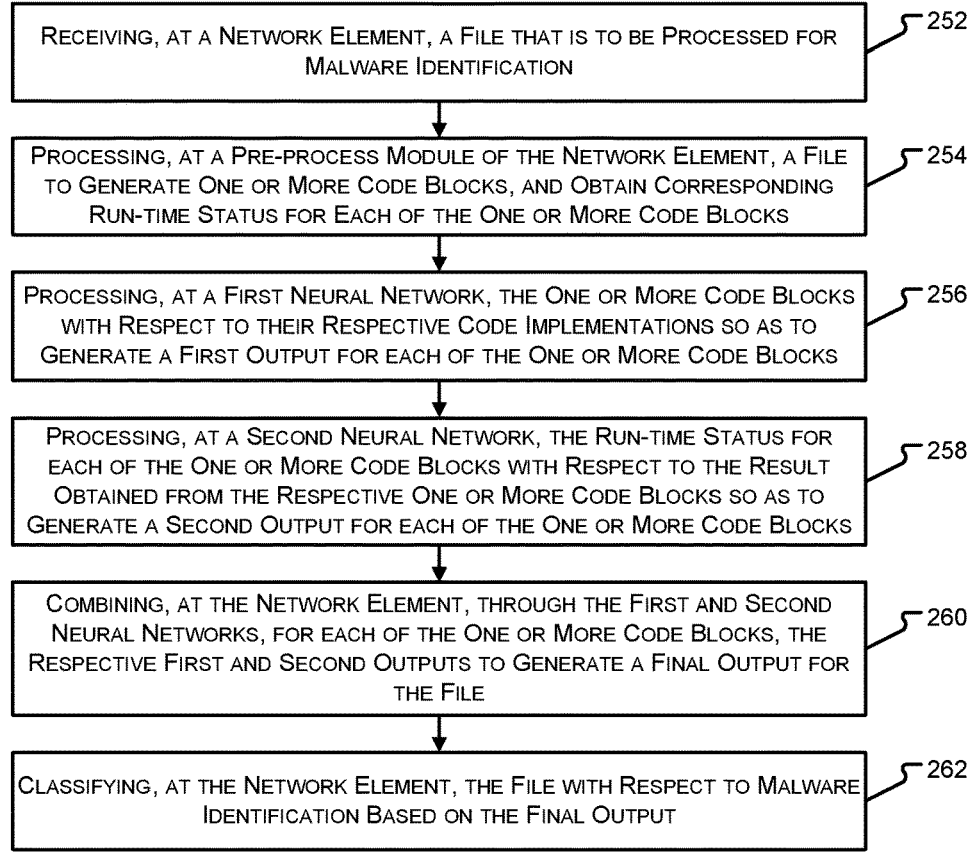
FIG. 2B is a high-level flow diagram illustrating the processing of an executable file to determine whether it contains malware using multiple neural networks in accordance with an embodiment of the present invention.

FIG. 2B is a high-level flow diagram 250 illustrating the processing of an executable file to determine whether it contains malware using multiple neural networks in accordance with an embodiment of the present invention. In context of the present example, it is assumed two deep neural networks have previously been trained by backpropagation with a mini-batch gradient decent optimizer in which one of the two deep neural networks was trained based on one or more static features extracted from code blocks of training samples, including both known malware and known benign samples and the other of the two deep neural networks was trained based on one or more dynamic features extracted from corresponding code blocks of the training samples.

At block 252, the malware detection model implemented within a network element of a cloud-based cybersecurity service (e.g., cyber security service 120) or implemented within a network security device (e.g., network security device 115), such as a UTM appliance, protecting a private network may receive an executable file on which malware scanning is to be performed.

At block 254, the executable file may be pre-processed, for example, by pre-process module 202, to generate multiple code blocks. The code blocks may represent various subsets of assembly language instructions produced as a result of a disassembly process performed on the machine language instructions contained in the executable file. In one embodiment, code blocks may be identified by parsing the assembly language instructions for certain code block delimiters including, but not limited to, jump instructions, conditional jump instructions and call instructions. Additionally, the corresponding run-time status of each code block can be obtained by executing the code block in a virtual environment.

In one embodiment of the present example, for each code block, the code block can be provided as input to a first neural network (e.g., DNN 206) and its corresponding run-time status can be provided as input to a second neural network (e.g., DNN 208). At block 256, DNN 206 may evaluate one or more static features (e.g., code implementation) upon which it has been previously trained for each code block to generate a first output for each code block and at block 258, DNN-208 may process evaluate one or more dynamic features (e.g., run-time status) upon which it has been previously trained for each code block to generate a second output for each code block.

Alternatively, during malware detection processing (e.g., malware scanning) only one DNN (e.g., one of DNN 206 and DNN 208), which has the unified weight and bias information can be used. For example, since all the weight and bias information has been unified between DNN 206 and DNN 208, DNN 206 can be used during malware detection processing for better performance as the code blocks can be extracted easily and the features used are static. In short, in one embodiment two DNNs (e.g., DNN 206 and DNN 208) are used for training in order to generate one DNN with unified weight and bias information that can be used for malware scanning. In other embodiments, this one DNN used for malware scanning could represent the training results of DNN-206 and DNN-208 in different ways, for example, a 50% weighting of the result produced by DNN 206 could used in combination with a 50% weighting of the result produced by DNN 208 to generate a scanning DNN. Alternatively, if the run-time features are thought to be more relevant, then the results could be weighted 40/60 to generate a malware scanning DNN that weights DNN 208 more heavily. This after the fact weighting is similar to how the unified weight and bias information is adjusted during the training phase, but performed at a different stage.

At block 260, to the extent two DNNs are used for malware scanning, the two outputs can be combined to produce a final output, for example, by averaging the two outputs. The final output represents the similarity to the trained samples. For example, 99% similarity to a particular trained malicious sample (e.g., malicious sample #100), 98% similarity to another trained malicious sample (e.g., malicious sample #202), 35% similarity to a particular trained clean sample (e.g., clean sample #87), etc. For purposes of illustration, the similarity of an executable file at issue to various trained samples can be thought of in the context of image recognition, where, for example, based on previously performed training, a DNN may identify an animal in an image as having 99% similarity to a cat, 95% similarity to a tiger, etc. When only a single DNN is used during the malware scanning process, no combination of outputs is required. In yet a further alternative embodiment, the code blocks can be run through a malware detection model produced based on the training and unified weight and bias of the dual neural network to produce the final output. For example, training can be performed within cybersecurity service 120 and a resulting malware detection model resulting from the training can be delivered to a network security device (e.g., network security device 115) and updated as an improved malware detection model is available so as to allow malware scanning to be performed locally by the network security device.

Finally, at block 262, the executable file can be classified as being malware or benign based on the final output.

Figure 3A:
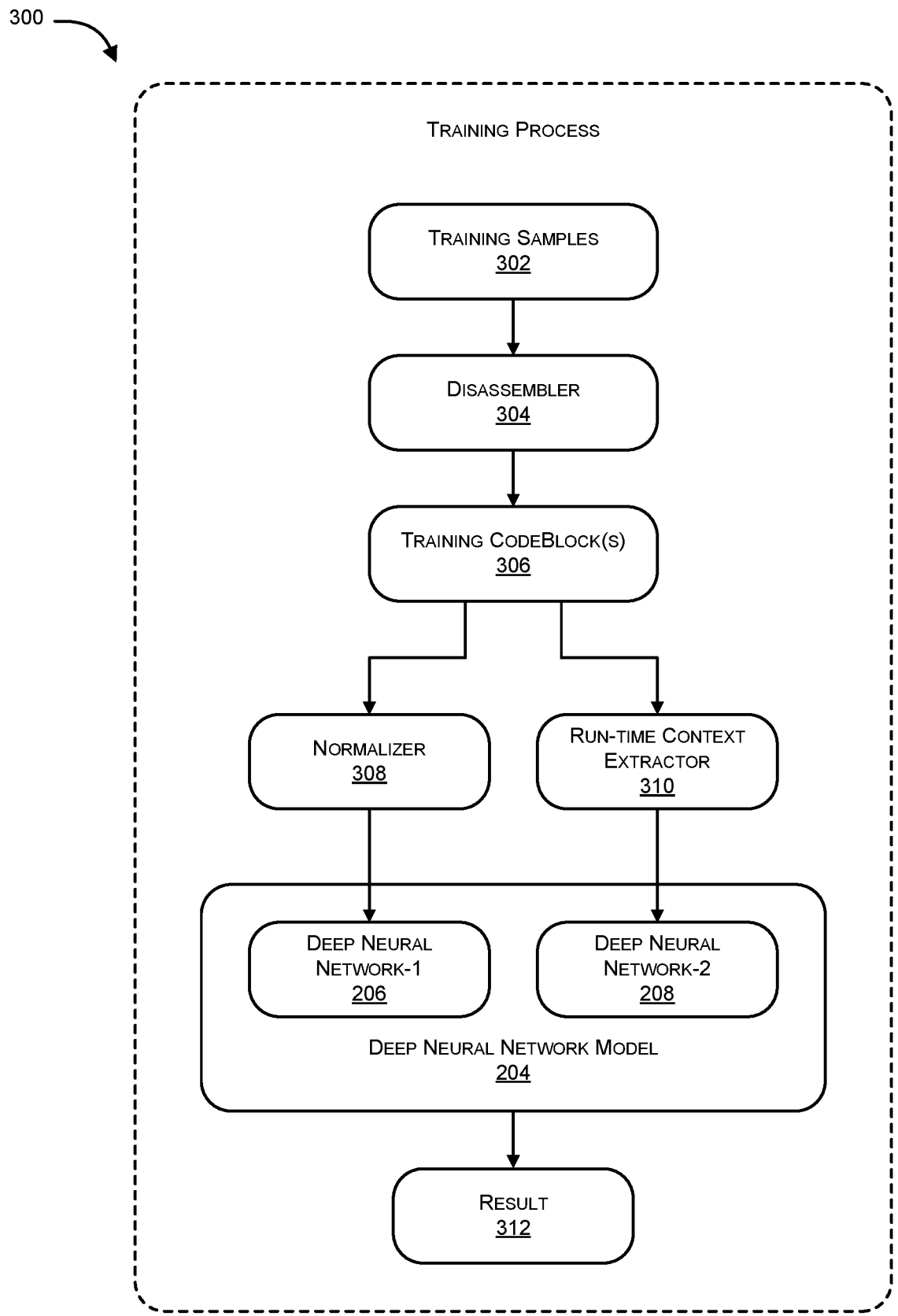
FIG. 3A is a simplified block diagram conceptually illustrating training of multiple neural networks for enhanced malware identification in accordance with an embodiment of the present invention.

FIG. 3A is a simplified block diagram 300 conceptually illustrating training of multiple neural networks for enhanced malware identification in accordance with an embodiment of the present invention. According to one embodiment, the training process can be performed within a system (e.g. system 102) implemented within a network element (e.g., network element 106) of a cloud-based cybersecurity service (e.g., cybersecurity service 120). In the context of the present example, training samples 302 (e.g., in the form of executable files), including both malicious samples as well as benign samples are first processed by a disassembler 304 that can be a part of a pre-processing module (e.g., pre-process module 202). Disassembler 304 can translate the machine language instructions contained within the executable file into corresponding assembly language instructions and can generate training code blocks 306 by using pre-defined delimiters to parse and separate the assembly language code as described above with reference to FIG. 2A. Further, each training code block can be processed to extract various features. In an example, each training code block can be processed by a normalizer 308 and run-time context extractor 310. Normalizer 308 and run-time context extractor 310 can be a part of system 102 or pre-processing module 202.

Normalizer 308 processes each of the training code blocks 306 to normalize operands in each training code block to produce normalized training code blocks. In one embodiment, general purpose registers can be normalized to any of reg8, reg16, reg32 or reg64 based on their type, while the rest of the general purpose registers including ebp, esi, edi, esp, rbp, rsi, rdi, rsp can remain the same. Further, all immediate values can be normalized to imm32 or imm64 based on 32-bit or 64-bit architecture. For example, an instruction "mov eax, [ebp+04h]" can be normalized as "mov reg32, [ebp+imm32]" and an instruction "rax, 0FFFFFFFFFFFFFFFFh" can be normalized as "reg64, imm64".

Run-time context extractor 310 extracts the run-time status for each training code block. In one embodiment, the run-time status includes the values of all general purpose registers and the flags register as a result of executing the training code block. Alternatively or additionally, other dynamic features may be extracted, including, but not limited to run-time results (e.g., the status of one or more registers) produced by executing the training code block, call flows resulting from executing the training code block, a path profile resulting from executing the training code block. Similarly, other features such as a graph or topology of the training samples 302 using call flows for each training code block can be analyzed.

According to an embodiment, deep neural network model 204 can include multiple neural networks, for example, DNN 206 and DNN 208, such that outputs of normalizer 308 and run-time context extractor 310 can be fed into DNN 206 and DNN 208, respectively. DNN 206 and DNN 208 can be trained by back-propagation using a mini-batch gradient descent optimizer. Thus, DNN 206 can process each normalized training code block to generate a first training output for each normalized training code block and DNN 208 can process the corresponding run-time result of each training code block to generate a second training output for each training code block.

In an embodiment, DNN 206 and DNN 208 may periodically share weight and bias information with each other to adjust their respective internal weights and biases. For example, after each mini-batch of training code blocks (e.g., 500 training code blocks), the two neural networks may unify the weight and bias via a unify function. In one embodiment, the function $f(x,y)=a*x+b*y$ can be used. As such, in this embodiment, the weight will be $(a*weight_1+b*weight_2)$, and the bias will be $(a*bias_1+b*bias_2)$. The value of a and b will be from 0 to 1. The result of $f(a,b)$ and the weight and bias from each neural network can be stored for tuning purposes in the form of result 312. In the context of a dual neural network in which both are given equal consideration, a=b=0.5. As those skilled in the art will appreciate, there could be more neural network added into this implementation, which would change the unify function to the more generalized form of $f(x_1, x_2 \ldots x_n)=(a_1*x_1+a_2*x_2+ \ldots a_n*x_n)$. In this manner, the neuron's basic structure can be changed from a single activation source to a multiple activation source by adding weight and bias from different networks. Thus, whether the neuron will be active depends on multiple neural networks. In view of the foregoing, those skilled in the art will appreciate that, in addition to learning from the training samples, the multiple neural networks of the neural network model 204 also learn from and criticize each other, which is thought to aid in increasing the efficiency and accuracy of detecting the existence of malware.

Figure 3B:
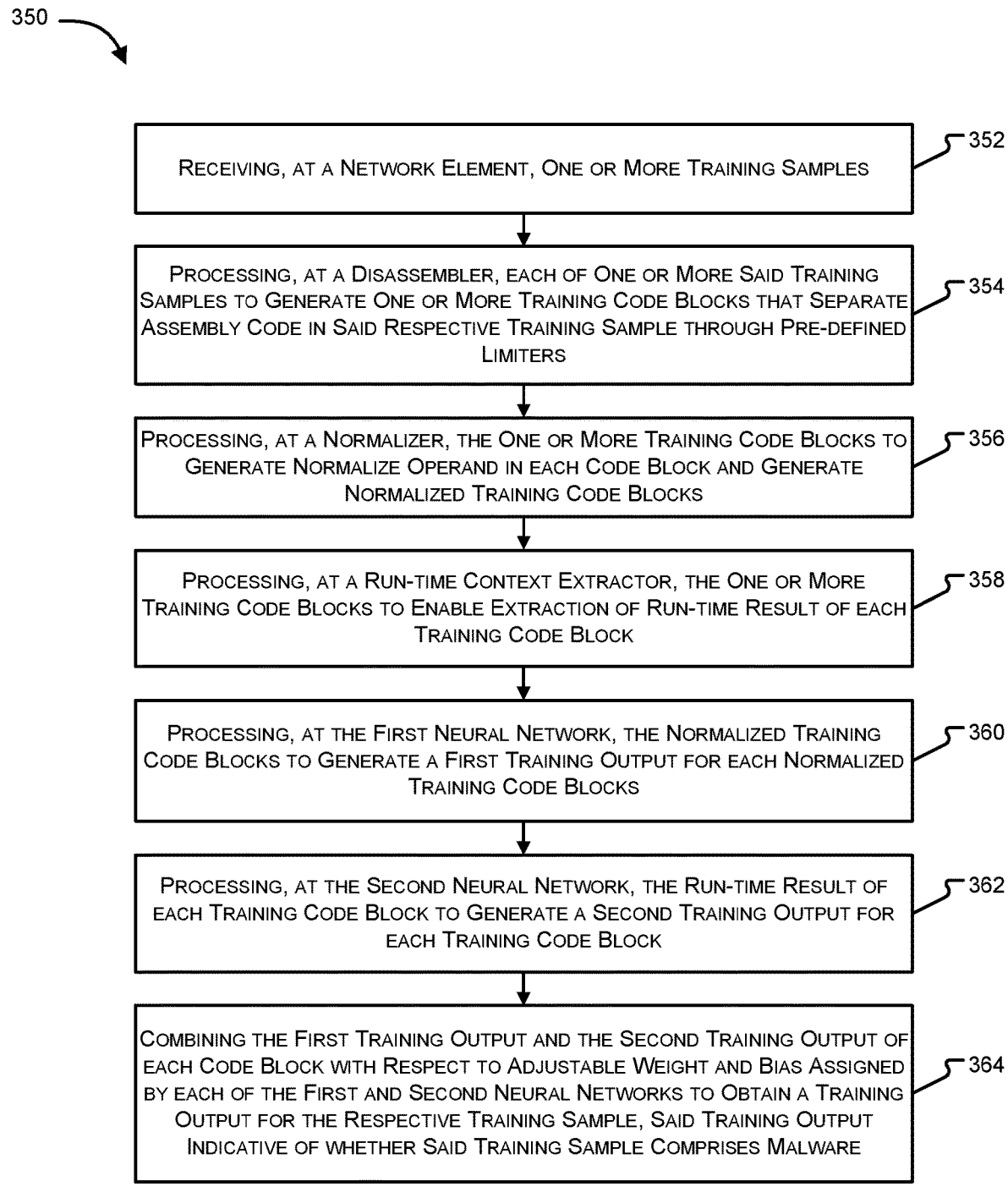
FIG. 3B is a high-level flow diagram illustrating training of multiple neural networks in accordance with an embodiment of the present invention.

FIG. 3B is a high-level flow diagram 350 illustrating training of multiple neural networks in accordance with an embodiment of the present invention.

According to an embodiment, at block 352, network element 106 can receive training samples 302 including malicious samples as well as benign samples. Empirical data suggests training samples numbering between about 10 million to about 30 million and comprising about 70% malicious samples and about 30% clean samples represents a reasonable sample library. In one embodiment, the sample library may include a total of 23 million samples, including 13 million clean samples and 10 million malware samples. Those skilled in the art will appreciate that the more samples are trained, the better results that can be achieved and that by training more clean samples the false positive rate can be decreased.

At block 354, training samples 302 can be processed to generate training code blocks 306 by using pre-defined delimiters or a fixed number of instructions to divide the assembly language code into multiple training code blocks.

Further, each training code block can be processed to extract various features. In an example, at block 356, each training code block can be processed by a normalizer 308 to generate normalize operands in each training code block so that normalized training code blocks can be generated and at block 358, each training code block can be processed by a run-time context extractor 310 to extract run-time result of each training code block that can include the values of all or a subset of general purpose registers and all or a subset of flags in the flags register. Similarly, other features such as topology of the training samples 302 using call flows of each training code block can be analyzed.

According to an embodiment, each feature can be processed using a distinct neural network. For example, at block 360, DNN 206 can process each normalized training code block to generate a first training output for each normalized training code block, and at block 362, DNN 208 can process the run-time result of each training code block to generate a second training output for each training code block.

Further, at block 364, the first training output and the second training output of each code block can be periodically combined (e.g., unified according to the above-described unify function) to achieve an optimized value for the current training sample. The training output can be indicative of whether the training sample is deemed to be malware. According to an implementation, a mini batch can include an appropriate number of training samples and after processing of each mini-batch, DNN 206 and DNN 208 can combine weight and bias by using a unify function.

Those skilled in the art would appreciate that a similar process as described above can be utilize to train other neural networks that may be a part of deep neural network model 204.

Figure 4A:
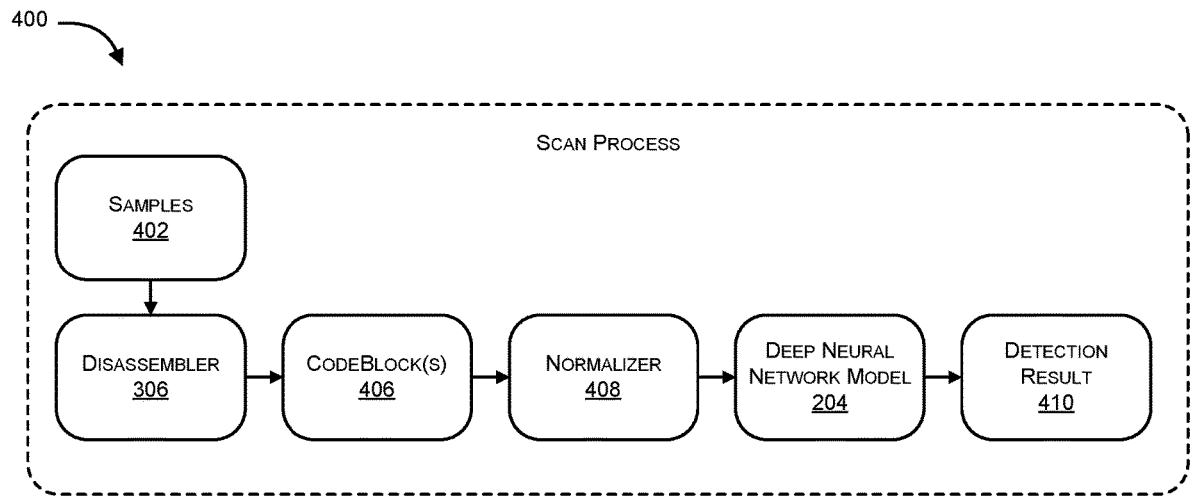
FIG. 4A is a simplified block diagram conceptually illustrating classification of samples through multiple neural networks for enhanced malware identification in accordance with an embodiment of the present invention.

FIG. 4A is a simplified block diagram 400 conceptually illustrating classification of samples through multiple neural networks for enhanced malware identification in accordance with an embodiment of the present invention. In the context of the present example, during a malware scanning process, multiple trained neural networks (or a malware detection model produced thereby) are utilized to identify the existence of malware in a sample (e.g., an executable file at issue). A sample 402 is received by system 102 for malware identification. System 102 can process sample 402 using a dissembler 306 to generate code blocks 406. The code blocks 406 can be passed to normalizer 408 to generate normalized code blocks. Also, various other features of the code blocks, for example, run-time result of each code block, topology of the samples using call flows of each code block, etc. can be obtained.

Further, deep neural network model 204 that includes multiple trained neural networks can process each feature by a distinct trained neural network to obtain respective outputs. Further, the outputs from multiple neural networks can be combined to obtain a final output. In an example, in order to combine the outputs, an average weight and average bias of weights and bias from multiple neural networks can be computed. The final output can then be processed to obtain a detection result 410. In an embodiment, detection result 410 may indicate whether the sample includes a malware and can be obtained by comparing the final output with the training outputs of the training samples.

Figure 4B:
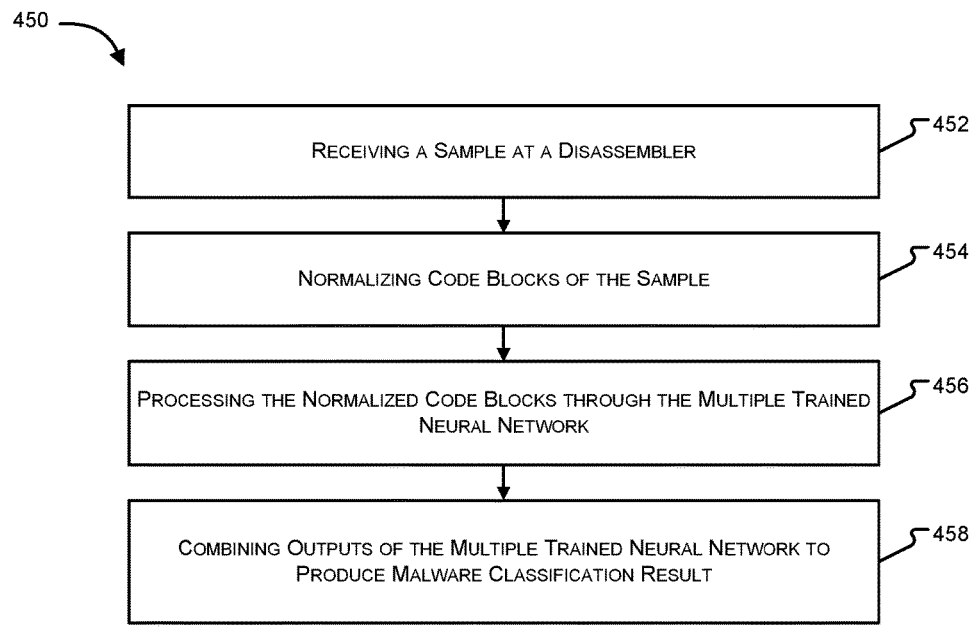
FIG. 4B is a high-level flow diagram illustrating scanning of samples through the dual neural network in accordance with an embodiment of the present invention.

FIG. 4B is a high-level flow diagram 450 illustrating scanning of samples through the dual neural network in accordance with an embodiment of the present invention. According to an embodiment, during a malware scanning process, at block 452 a sample 402 can be received by system 102 for malware identification. Sample 402 can be processed using a dissembler 306 to generate code blocks 406. At block 454, code blocks 406 can be passed to normalizer 408 to generate normalized code blocks. Also, various other features of the code blocks, for example, run-time result of each code block, topology of the samples using call flows of each code block, etc. can be obtained.

Further, at block 456, each feature can be processed by a distinct trained neural network to obtain respective outputs and at block 458 the outputs from multiple neural networks can be combined to obtain a final output. The final output can then be processed to obtain a malware classification result that may indicate whether the sample includes a malware. In an embodiment, the malware classification result can be obtained by comparing the final output with the training outputs of the training samples.

Figure 5:
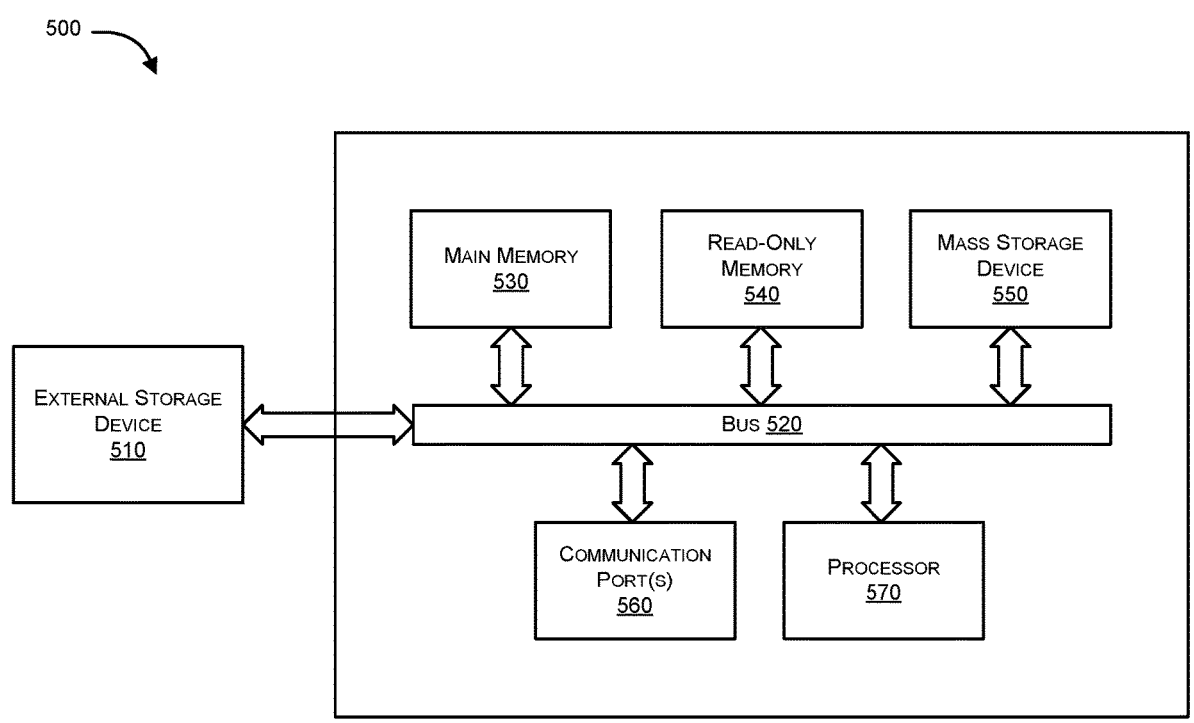
FIG. 5 illustrates an exemplary computer system in which or with which embodiments of the present invention may be utilized.

FIG. 5 illustrates an exemplary computer system 500 in which or with which embodiments of the present invention may be utilized. Computer system 500 may represent a portion of a network security device (e.g., network security device 115, a network element (e.g., network element 106) or system 102.

As shown in FIG. 5, computer system 500, includes an external storage device 510, a bus 520, a main memory 530, a read only memory 540, a mass storage device 550, a communication port 560, and a processor 570. Computer system may represent some portion of cyber security service (e.g., network element 106 or client device 110) or system 102.

Those skilled in the art will appreciate that computer system 500 may include more than one processor 570 and communication ports 560. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g. start-up or BIOS instructions for processor 570.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system. Other operator and administrative interfaces can be provided through network connections connected through communication port 560. External storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method of training a deep neural network model for classification of malware, the method comprising:
    for each training sample of a plurality of training samples, including malware samples and benign samples in a form of executable files, performing a supervised learning process, including:
        generating, by a pre-processing module running on a computer system, a plurality of code blocks of assembly language instructions by disassembling machine language instructions contained within the training sample,
        wherein said generating, by a pre-processing module running on a computer system, a plurality of code blocks further comprises dividing the assembly language instructions into the plurality of code blocks by parsing the assembly language instructions for a predetermined or configurable set of code block delimiters, wherein the predetermined or configurable set of code block delimiters include a jump instruction, a conditional jump instruction and a call instruction;
        extracting, by the pre-processing module, dynamic features corresponding to each of the plurality of code blocks by executing each of the plurality of code blocks within a virtual environment;
        for each code block of the plurality of code blocks:
            feeding the code block into a first neural network:
            feeding the corresponding dynamic features for the code block into a second neural network;
        updating weights and biases of the first neural network and weights and biases of the second neural network based on whether the training sample was a malware sample or a benign sample; and
        after processing a predetermined or configurable number of the plurality of training samples, the first neural network and the second neural network criticize each other and unify their respective weights and biases by exchanging their respective weights and biases and adjusting their respective weights and biases accordingly, wherein the first neural network updates the weights and biases of the first neural network based on a function of the weights and biases of the first neural network and the weights and biases received from the second neural network and the second neural network updates the weights and biases of the second neural network based on a function of the weights and biases of the second neural network and the weights and biases received from the first neural network.

2. The method of claim 1, wherein the first neural network and the second neural network are trained by backpropagation using a gradient-based optimizer.

3. The method of claim 2, wherein the gradient-based optimizer comprises a gradient descent optimizer.

4. The method of claim 1, wherein the corresponding dynamic features comprise run-time status of each of the plurality of code blocks.

5. The method of claim 4, wherein the run-time status for a particular code block of the plurality of code blocks comprises a status of one or more general purpose registers and a status of a flags register after execution of the particular code block within the virtual environment is complete.

6. The method of claim 1, wherein the computer system is part of a cloud-based cybersecurity service.

7. A non-transitory, computer-readable medium comprising source code that, when executed by a processor, performs a method of training a deep neural network model for classification of malware, the method comprising:
for each training sample of a plurality of training samples, including malware samples and benign samples in a form of executable files, performing a supervised learning process, including:
generating, by a pre-processing module running on a computer system, a plurality of code blocks of assembly language instructions by disassembling machine language instructions contained within the training sample,
wherein said generating, by a pre-processing module running on a computer system, a plurality of code blocks further comprises dividing the assembly language instructions into the plurality of code blocks by parsing the assembly language instructions for a predetermined or configurable set of code block delimiters, wherein the predetermined or configurable set of code block delimiters include a jump instruction, a conditional jump instruction and a call instruction;
extracting, by the pre-processing module, dynamic features corresponding to each of the plurality of code blocks by executing each of the plurality of code blocks within a virtual environment;
for each code block of the plurality of code blocks:
feeding the code block into a first neural network:
feeding the corresponding dynamic features for the code block into a second neural network;
updating weights and biases of the first neural network and weights and biases of the second neural network based on whether the training sample was a malware sample or a benign sample; and
after processing a predetermined or configurable number of the plurality of training samples, the first neural network and the second neural network criticize each other and unify their respective weights and biases by exchanging their respective weights and biases and adjusting their respective weights and biases accordingly, wherein the first neural network updates the weights and biases of the first neural network based on a function of the weights and biases of the first neural network and the weights and biases received from the second neural network and the second neural network updates the weights and biases of the second neural network based on a function of the weights and biases of the second neural network and the weights and biases received from the first neural network.

8. A network device for training a deep neural network model for classification of malware, the network device comprising:
a processor;
a network interface, coupled to the processor; and
a memory, coupled to the processor, and comprising:
a first module to, for each training sample of a plurality of training samples, including malware samples and benign samples in a form of executable files, perform a supervised learning process, including:
generating, by a pre-processing module running on a computer system, a plurality of code blocks of assembly language instructions by disassembling machine language instructions contained within the training sample,
wherein said generating, by a pre-processing module running on a computer system, a plurality of code blocks further comprises dividing the assembly language instructions into the plurality of code blocks by parsing the assembly language instructions for a predetermined or configurable set of code block delimiters, wherein the predetermined or configurable set of code block delimiters include a jump instruction, a conditional jump instruction and a call instruction;
extracting, by the pre-processing module, dynamic features corresponding to each of the plurality of code blocks by executing each of the plurality of code blocks within a virtual environment;
for each code block of the plurality of code blocks:
feeding the code block into a first neural network:
feeding the corresponding dynamic features for the code block into a second neural network;
updating weights and biases of the first neural network and weights and biases of the second neural network based on whether the training sample was a malware sample or a benign sample; and
after processing a predetermined or configurable number of the plurality of training samples, the first neural network and the second neural network criticize each other and unify their respective weights and biases by exchanging their respective weights and biases and adjusting their respective weights and biases accordingly, wherein the first neural network updates the weights and biases of the first neural network based on a function of the weights and biases of the first neural network and the weights and biases received from the second neural network and the second neural network updates the weights and biases of the second neural network based on a function of the weights and biases of the second neural network and the weights and biases received from the first neural network.

* * * * *